United States Patent
Kataoka et al.

(10) Patent No.: US 12,235,229 B2
(45) Date of Patent: Feb. 25, 2025

(54) X-RAY FLUORESCENCE SPECTROMETER

(71) Applicant: RIGAKU CORPORATION, Akishima (JP)

(72) Inventors: Yoshiyuki Kataoka, Otsu (JP); Shin Tanaka, Ibaraki (JP); Yasushi Kusakabe, Ibaraki (JP)

(73) Assignee: Rigaku Corporation, Tokyo (JP)

( * ) Notice: Subject to any disclaimer, the term of this patent is extended or adjusted under 35 U.S.C. 154(b) by 0 days.

(21) Appl. No.: 18/714,382

(22) PCT Filed: Nov. 9, 2022

(86) PCT No.: PCT/JP2022/041747
§ 371 (c)(1),
(2) Date: May 29, 2024

(87) PCT Pub. No.: WO2023/100611
PCT Pub. Date: Jun. 8, 2023

(65) Prior Publication Data
US 2024/0418661 A1    Dec. 19, 2024

(30) Foreign Application Priority Data
Dec. 1, 2021 (JP) .................................. 2021-195356

(51) Int. Cl.
*G01N 23/223* (2006.01)
(52) U.S. Cl.
CPC ... *G01N 23/223* (2013.01); *G01N 2223/0763* (2013.01)
(58) Field of Classification Search
CPC .............. G01N 23/223; G01N 23/207; G01N 2223/076; G01N 2223/0766;
(Continued)

(56) References Cited

U.S. PATENT DOCUMENTS

| 7,187,751 B2 | 3/2007 | Kawahara et al. |
| 8,433,035 B2 | 4/2013 | Watanabe et al. |

(Continued)

FOREIGN PATENT DOCUMENTS

| CN | 112748140 A | 5/2021 | |
| EP | 3336527 A1 * | 6/2018 | ........... G01N 23/207 |

(Continued)

OTHER PUBLICATIONS

International Search Report of PCT/JP2022/041747 dated Jan. 10, 2023 [PCT/ISA/210].

(Continued)

*Primary Examiner* — Irakli Kiknadze
(74) *Attorney, Agent, or Firm* — Sughrue Mion, PLLC (57) ABSTRACT

An X-ray fluorescence spectrometer according to the present invention includes a calculation unit (10) configured to calculate a content of each element in a sample (13) using an FP method, wherein the calculation unit (10) is configured to: in order to take into consideration an influence of unmeasured elements for which the fluorescent X-rays are not measured, use shorter-wavelength scattered X-rays of primary X-rays having a wavelength of 0.05 nm or more and 0.075 nm or less, and longer-wavelength scattered X-rays of the primary X-rays having a wavelength of 0.11 nm or more and 0.23 nm or less as scattered X-rays whose intensities are measured by a detection unit (9), assume a mean atomic number for elements other than hydrogen included in the unmeasured elements, and assume a content for hydrogen.

2 Claims, 5 Drawing Sheets

(58) Field of Classification Search
CPC ........... G01N 23/2209; G01N 23/2202; G01N 1/2273; G01N 33/222; G01N 23/2055; G01N 2223/071; G01N 2223/623; G01N 33/54373; G01N 33/54313; G01N 23/2076; G01N 23/2206; G01N 33/42; G01N 2223/652; G01N 2223/063; G01N 33/6872; G01N 33/502; G01N 33/566; G01N 23/2204; G01N 2500/04; G01T 1/36; H05G 2/008; H05G 2/003
USPC ...................................................... 378/45, 62
See application file for complete search history.

(56) References Cited

U.S. PATENT DOCUMENTS

| | | | |
|---|---|---|---|
| 11,054,375 B2 * | 7/2021 | Seidler | G01N 23/20091 |
| 2006/0274882 A1 | 12/2006 | Kawahara et al. | |
| 2009/0067572 A1 * | 3/2009 | Grodzins | G01N 23/223 378/45 |
| 2011/0243301 A1 | 10/2011 | Watanabe et al. | |
| 2012/0288058 A1 * | 11/2012 | Maeyama | G01N 23/2206 378/46 |
| 2018/0095045 A1 * | 4/2018 | Grof | G01N 23/2202 |
| 2019/0064084 A1 * | 2/2019 | Ullom | G01T 1/36 |

FOREIGN PATENT DOCUMENTS

| | | |
|---|---|---|
| JP | 06-186015 A | 7/1994 |
| JP | 08-334481 A | 12/1996 |
| JP | 2000-162162 A | 6/2000 |
| JP | 2006-071311 A | 3/2006 |
| JP | 2006-343112 A | 12/2006 |
| JP | 3965173 B2 | 8/2007 |
| JP | 2010-223908 A | 10/2010 |
| WO | 2011/027613 A1 | 3/2011 |

OTHER PUBLICATIONS

International Preliminary Report on Patentability of PCT/JP2022/041747 dated Jun. 13, 2024, PCT/ISA/338.

Luo li qiang et al., "X-ray fluorescence spectrometer", Chemical Industry Press, Jan. 31, 2008, pp. 9 to 13.

Shou man li, "Instrumental analysis 2 Emission spectrum analysis", Geological Publishing House, Oct. 31, 1985, p. 286 with English machine translation.

Communication issued in corresponding Chinese Patent Application No. 202280080026.4, dated Oct. 10, 2024.

Sanders Ronald W. et al: "Multielement analysis of unweighted oil samples by x-ray fluorescence spectrometry with two excitation sources", Nalytical Chemistry, vol. 55, Oct. 1, 1983 (Oct. 1, 1983), pp. 1911-1914.

Mikhailov I F et al: "Determination of coal ash content by the combined x-ray fluorescence and scattering spectrum", Review of Scientific Instruments, vol. 89, article No. 023103, Feb. 1, 2018, pp. 1-5.

Communication issued in corresponding European Patent Application No. 229010442.1, dated Nov. 12, 2024.

* cited by examiner

| Short-wavelength scattered X-rays | Wavelength nm | Long-wavelength scattered X-rays | | Rh-KA Thom | Rh-KA cont | Mo-KA Thom | Mo-KA cont | Sr-KA cont | As-KA cont | Ga-KA cont | Cu-KA cont | Cu-KA Thom | Fe-KA cont | Cr-KA cont | Ti-KA cont |
|---|---|---|---|---|---|---|---|---|---|---|---|---|---|---|---|
| | | Wavelength nm | | 0.062 | 0.062 | 0.071 | 0.071 | 0.088 | 0.118 | 0.134 | 0.154 | 0.154 | 0.194 | 0.229 | 0.275 |
| Ag-KA Comp | 0.056 | h error | | 7.9 | 10 or more | | 4.1 | 1.6 | 1.3 | 1.2 | 1.2 | | 1.2 | 1.2 | 1.2 |
| | | z error | | 1.8 | 2 or more | | 0.82 | 0.15 | 0.12 | 0.10 | 0.08 | | 0.08 | 0.11 | 0.17 |
| Rh-KA Comp | 0.062 | h error | | 7 or more | | | 5.2 | 1.6 | 1.3 | 1.2 | 1.1 | 1.2 | 1.1 | 1.1 | 1.2 |
| | | z error | | 1.3 or more | | | 0.87 | 0.15 | 0.13 | 0.10 | 0.08 | 0.13 | 0.07 | 0.11 | 0.16 |
| Rh-KA Thom | 0.062 | h error | | | | | | | | | 8.9 | | | | |
| | | z error | | | | | | | | | 0.36 | | | | |
| Rh-KA cont | 0.062 | h error | | | | | | | | | 1.3 | | | | |
| | | z error | | | | | | | | | 0.08 | | | | |
| Rh-KA Comp / Rh-KA Thom | 0.062 | h error | | | | | | | | | 1.1 | | | | |
| | | z error | | | | | | | | | 0.08 | | | | |
| Mo-KA Comp | 0.071 | h error | | | | 5.7 | | 1.5 | 1.4 | 1.1 | 1.1 | | 1.1 | 1.2 | 1.5 |
| | | z error | | | | 1.0 | | 0.14 | 0.14 | 0.11 | 0.08 | | 0.07 | 0.12 | 0.15 |
| Sr-KA cont | 0.088 | h error | | | | | | | 1.8 | 4.8 | 5.4 | | 5.0 | 6.4 | 8.3 |
| | | z error | | | | | | | 0.15 | 0.16 | 0.18 | | 0.17 | 0.16 | 0.20 |
| As-KA cont | 0.118 | h error | | | | | | | | 13.9 | 3.6 | | 3.6 | 8.3 | 15.9 |
| | | z error | | | | | | | | 0.69 | 0.18 | | 0.18 | 0.42 | 0.91 |
| Ga-KA cont | 0.134 | h error | | | | | | | | | 8.2 | | 11.8 | 15.5 | 23.1 |
| | | z error | | | | | | | | | 0.36 | | 0.59 | 0.86 | 1.28 |
| Cu-KA cont | 0.154 | h error | | | | | | | | | | | 20.2 | 16.8 | 20.3 |
| | | z error | | | | | | | | | | | 0.87 | 0.84 | 1.02 |
| Fe-KA cont | 0.194 | h error | | | | | | | | | | | | 32.8 | 31.2 |
| | | z error | | | | | | | | | | | | 1.40 | 1.34 |
| Cr-KA cont | 0.229 | h error | | | | | | | | | | | | | 30.8 |
| | | z error | | | | | | | | | | | | | 1.32 |

X-RAY FLUORESCENCE SPECTROMETER

CROSS REFERENCE TO THE RELATED APPLICATION

This application is a National Stage of International Application No. PCT/JP2022/041747 filed on Nov. 9, 2022, based on and claims Convention priority to Japanese patent application No. 2021-195356, filed Dec. 1, 2021, the entire disclosure of which is herein incorporated by reference as a part of this application.

BACKGROUND OF THE INVENTION

Field of the Invention

The present invention relates to an X-ray fluorescence spectrometer that analyzes a composition of a sample using a fundamental parameter method.

Description of Related Art

Conventionally, X-ray fluorescence spectrometers that analyze the composition and an area density (masses per unit area) of a sample using a fundamental parameter method (hereinafter, also referred to as "FP method") have been available. In the FP method, a theoretical intensity of secondary X-rays generated from each element in the sample is calculated on the basis of assumed contents of the elements, and the assumed contents of the elements are recalculated through successive approximation such that the theoretical intensity matches a converted measured intensity obtained by converting a measured intensity measured by a detection unit into a theoretical intensity scale, to calculate a content of each element in the sample. Here, an element such as oxygen and carbon for which fluorescent X-rays are not measured (an element for which fluorescent X-rays, in effect, cannot be measured because of the low intensity and the high attenuation due to absorption; hereinafter referred to as "unmeasured element") is usually treated as the balance, but poses a problem for samples such as sludge, incinerated ash, and a biological sample that contain many unmeasured elements whose atomic numbers cannot be identified.

As a conventional technology relating to this, there is an X-ray fluorescence spectrometer as follows. That is, the X-ray fluorescence spectrometer assumes a mean atomic number of elements included in the unmeasured elements that are other than hydrogen and uses, in place of fluorescent X-rays, any one of Compton scattered X-rays of characteristic X-rays of primary X-rays, Thomson scattered X-rays of the characteristic X-rays of the primary X-rays, and scattered X-rays of continuous X-rays of the primary X-rays so as to correspond to the unmeasured elements other than hydrogen, and assumes a content for hydrogen and uses, in place of fluorescent X-rays, scattered X-rays different from the scattered X-rays corresponding to the elements other than hydrogen for which the mean atomic number is assumed so as to correspond to hydrogen. Here, although Compton scattered X-rays of Rh-Kα and Thomson scattered X-rays of Rh-Kα are illustrated as the Compton scattered X-rays and the Thomson scattered X-rays of the characteristic X-rays of the primary X-rays, specific wavelengths of the scattered X-rays of the continuous X-rays of the primary X-rays are not illustrated (see paragraphs 0013, 0044, 0046 to 0048, etc., of Patent Document 1).

RELATED DOCUMENT

Patent Document

[Patent Document 1] Japanese Patent No. 3965173

SUMMARY OF THE INVENTION

When the Compton scattered X-rays and the Thomson scattered X-rays of Rh-Kα are used in place of the fluorescent X-rays for the unmeasured element as in the case of the technology described in Patent Document 1, small errors of measurement in the measured intensities of these scattered X-rays significantly affect the quantitative value of the content of hydrogen, and the quantitative value of the mean atomic number of the unmeasured elements other than hydrogen to increase errors in those quantitative values. This results in an increase in an error in a content of each measured element for which the fluorescent X-rays are measured, so that a sample containing a large amount of hydrogen in particular as the unmeasured element cannot be sufficiently accurately analyzed.

The present invention has been made in view of the above-described conventional problem, and an object thereof is to provide an X-ray fluorescence spectrometer that analyzes a composition of a sample using an FP method, and that can sufficiently accurately analyze a sample containing a large amount of hydrogen in particular as the unmeasured element.

In order to attain the aforementioned object, first, the present invention provides an X-ray fluorescence spectrometer including: an X-ray source configured to irradiate a sample with primary X-rays; a detection unit configured to measure an intensity of fluorescent X-rays generated from each of elements in the sample, and intensities of scattered X-rays of the primary X-rays; and a calculation unit configured to: calculate a theoretical intensity of the fluorescent X-rays generated from said each element in the sample on the basis of assumed contents of the elements; and recalculate the assumed contents of the elements through successive approximation such that the theoretical intensity matches a converted measured intensity obtained by converting a measured intensity obtained by the detection unit into a theoretical intensity scale, to calculate a content of each element in the sample.

Also, the calculation unit is configured to: in order to take into consideration an influence of unmeasured elements for which the fluorescent X-rays are not measured, use shorter-wavelength scattered X-rays of the primary X-rays having a wavelength of 0.05 nm or more and 0.075 nm or less, and longer-wavelength scattered X-rays of the primary X-rays having a wavelength of 0.11 nm or more and 0.23 nm or less, as the scattered X-rays whose intensities are measured by the detection unit, assume a mean atomic number for elements other than hydrogen included in the unmeasured elements, and assume a content for hydrogen.

Furthermore, the calculation unit is configured to solve simultaneous difference equations formulated for each type of the fluorescent X-rays and each type of the scattered X-rays whose intensities have been measured by the detection unit, to determine a correction value for updating the assumed content of each element, and a correction value for updating the assumed mean atomic number, thereby recalculating the assumed contents of the elements and the assumed mean atomic number through successive approximation such that the theoretical intensity and the converted measured intensity match for each type of the fluorescent X-rays and each type of the scattered X-rays, to calculate the content of each element in the sample.

The calculation unit is configured to, in performing this calculation, as the theoretical intensity and the measured intensity of the scattered X-rays, use a theoretical intensity and a measured intensity of Compton scattered X-rays of characteristic X-rays of the primary X-rays, a theoretical intensity ratio and a measured intensity ratio between the Compton scattered X-rays and Thomson scattered X-rays of the characteristic X-rays of the primary X-rays, or a theoretical intensity and a measured intensity of scattered X-rays of continuous X-rays of the primary X-rays for the shorter-wavelength scattered X-rays of the primary X-rays. The calculation unit is configured to use a theoretical intensity and a measured intensity of the Thomson scattered X-rays of the characteristic X-rays of the primary X-rays, a total theoretical intensity and a total measured intensity of the Compton scattered X-rays and the Thomson scattered X-rays of the characteristic X-rays of the primary X-rays, or the theoretical intensity and the measured intensity of the scattered X-rays of the continuous X-rays of the primary X-rays for the longer-wavelength scattered X-rays of the primary X-rays.

With the spectrometer according to the present invention, the respective wavelengths of a plurality of types of scattered X-rays used for taking into consideration the influence of the unmeasured elements are appropriately set such that the scattered X-rays differ in characteristics and have sufficient intensities. Accordingly, a sample containing a large amount of hydrogen in particular as the unmeasured element can be sufficiently accurately analyzed.

In the spectrometer according to the present invention, the calculation unit may be further configured to, also on the basis of an assumed area density, recalculate the assumed contents of the elements and the assumed area density through successive approximation, to calculate the content of each element and an area density in the sample. In this case, the calculation unit is configured to, in order to calculate the area density, use the shorter-wavelength scattered X-rays of the primary X-rays that are different from the shorter-wavelength scattered X-rays of the primary X-rays used for taking the influence of the unmeasured elements into consideration.

Also, the calculation unit is configured to solve simultaneous difference equations formulated for each type of the fluorescent X-rays and each type of the scattered X-rays whose intensities have been measured by the detection unit, to determine a correction value for updating the assumed content of each element, a correction value for updating the assumed mean atomic number, and a correction value for updating the assumed area density, thereby recalculating the assumed contents of the elements, the assumed mean atomic number, and the assumed area density through successive approximation such that the theoretical intensity and the converted measured intensity match for each type of the fluorescent X-rays and each type of the scattered X-rays, to calculate the content of each element and the area density in the sample. The calculation unit is configured to, in performing this calculation, additionally use, as the theoretical intensity and the measured intensity of the scattered X-rays, the theoretical intensity and the measured intensity of the Thomson scattered X-rays of the characteristic X-rays of the primary X-rays for the shorter-wavelength scattered X-rays of the primary X-rays.

With this configuration, the wavelength of the scattered X-rays used for calculating the area density is also appropriately set. Accordingly, the area density of the sample can also be sufficiently accurately analyzed.

Any combination of at least two constructions, disclosed in the appended claims and/or the specification and/or the accompanying drawings should be construed as being included within the scope of the present invention. In particular, any combination of two or more of the appended claims should be equally construed as being included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE EMBODIMENTS

Figure 1:
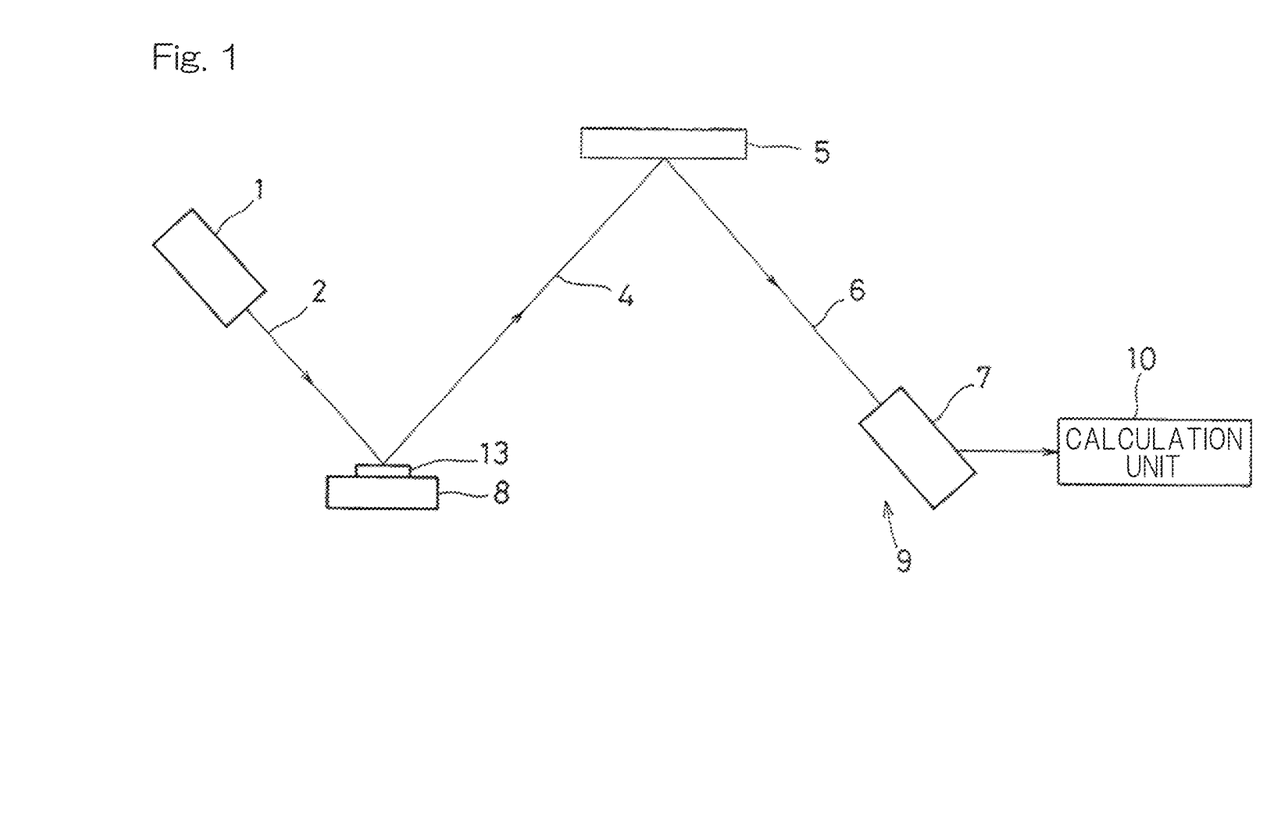
FIG. 1 is a schematic diagram showing an X-ray fluorescence spectrometer according to first and second embodiments of the present invention.

An X-ray fluorescence spectrometer according to a first embodiment of the present invention will now be described with reference to the drawings. As shown in FIG. 1, this spectrometer includes a sample stage 8 on which a sample 13 is placed, an X-ray source 1 configured to irradiate the sample 13 with primary X-rays 2, and a detection unit 9 configured to measure intensities of secondary X-rays 4 such as fluorescent X-rays and scattered X-rays, generated from the sample 13. Characteristic X-rays of the primary X-rays 2 are characteristic X-rays emitted from an X-ray tube and transmitted through a primary filter, fluorescent X-rays generated from characteristic X-rays emitted from the X-ray tube in the primary filter, or fluorescent X-rays generated from the characteristic X-rays emitted from the X-ray tube in a secondary target. The detection unit 9 is composed of a spectroscopic device 5 configured to monochromate the secondary X-rays 4 generated from the sample 13, and a detector 7 configured to measure, together with an amplifier, a pulse height analyzer, a counting unit, and the like (not shown), the intensity of each set of the monochromated secondary X-rays 6. Note that a detector having a high energy resolution may be used as the detection unit without using the spectroscopic device 5.

Also, the spectrometer includes a calculation unit 10 configured to calculate a theoretical intensity of the secondary X-rays 4 generated from each element in the sample 13, on the basis of assumed contents of the elements, and recalculate the assumed contents of the elements through successive approximation such that the theoretical intensity matches a converted measured intensity obtained by converting a measured intensity measured by the detection unit 9 into a theoretical intensity scale, to calculate a content of each element in the sample 13. The calculation unit 10, in order to take into consideration an influence of unmeasured elements for which the fluorescent X-rays 4 are not measured, uses shorter-wavelength scattered X-rays 4 of the primary X-rays 2 having a wavelength of 0.05 nm or more and 0.075 nm or less, and longer-wavelength scattered X-rays 4 of the primary X-rays 2 having a wavelength of 0.11 nm or more and 0.23 nm or less, as scattered X-rays 4 whose intensities are measured by the detection unit 9, assumes a mean atomic number for elements other than hydrogen included in the unmeasured elements, and assumes a content for hydrogen.

Furthermore, the calculation unit 10 solves simultaneous difference equations formulated for each type of the fluorescent X-rays and each type of the scattered X-rays, whose intensities have been measured by the detection unit 9, to determine a correction value for updating the assumed content of each element, and a correction value for updating the assumed mean atomic number, thereby recalculating the assumed contents of the elements and the assumed mean atomic number through successive approximation such that the theoretical intensity and the converted measured intensity match for each type of the fluorescent X-rays and each type of the scattered X-rays, to calculate the content of each element in the sample 13.

The calculation unit 10, in performing this calculation, as the theoretical intensity and the measured intensity of the scattered X-rays, uses a theoretical intensity and a measured intensity of Compton scattered X-rays 4 of characteristic X-rays of the primary X-rays 2, a theoretical intensity ratio and a measured intensity ratio between the Compton scattered X-rays 4 and Thomson scattered X-rays 4 of the characteristic X-rays of the primary X-rays 2, or a theoretical intensity and a measured intensity of scattered X-rays 4 of continuous X-rays of the primary X-rays 2, for the shorter-wavelength scattered X-rays 4 of the primary X-rays 2. The calculation unit 10 uses a theoretical intensity and a measured intensity of the Thomson scattered X-rays 4 of the characteristic X-rays of the primary X-rays 2, a total theoretical intensity and a total measured intensity of the Compton scattered X-rays 4 and the Thomson scattered X-rays 4 of the characteristic X-rays of the primary X-rays 2, or the theoretical intensity and the measured intensity of the scattered X-rays 4 of the continuous X-rays of the primary X-rays 2, for the longer-wavelength scattered X-rays 4 of the primary X-rays 2.

The scattered X-rays used for taking the influence of the unmeasured elements into consideration were evaluated in the following manner. First, a reference virtual sample serving as a reference and comparative virtual samples for comparison with the reference will be considered in order to investigate causes of the above-described problem in the conventional technique, that is, the fact that use of the Compton scattered X-rays of Rh-Kα and the Thomson scattered X-rays of Rh-Kα increases the errors in the content of hydrogen and the mean atomic number of the unmeasured elements other than hydrogen, resulting in the increase in the error in the content of each measured element.

The reference virtual sample is polyethylene ($-CH_2-$) having an area density of 180 mg/cm$^2$ and an Fe content of 0.0001 mass %. Since C is the only unmeasured element other than hydrogen, the mean atomic number of the reference virtual sample is 6, and the hydrogen content thereof is $(2/14) \times 100 \approx 14.3$ mass %. The comparative virtual samples are 221 different virtual samples that have the same area density and Fe content as the reference virtual sample, and for which the mean atomic number of the unmeasured elements other than hydrogen is varied from 2 to 10 by increments of 0.5, and the hydrogen content is varied from 0 mass % to 60 mass % by increments of 5 mass %. The purpose for setting the Fe content to be a trace amount is to reduce the influence of the content of the measured element Fe on the intensities of the scattered X-rays used for taking the influence of the unmeasured elements into consideration, to a negligible level.

Then, a relative error rate RE (%) of each of the comparative virtual samples with respect to the reference virtual sample was determined using the following expression (1). Here, $I_{s1hZ}$ is a theoretical intensity of the Compton scattered X-rays of Rh-Kα serving as first scattered X-rays s1 in a comparative virtual sample in which a hydrogen content is h and a mean atomic number of unmeasured elements other than hydrogen is Z, and $I_{s1}$ is a theoretical intensity of the Compton scattered X-rays of Rh-Kα serving as the first scattered X-rays s1 in the reference virtual sample. $I_{s2hZ}$ is a theoretical intensity of the Thomson scattered X-rays of Rh-Kα serving as second scattered X-rays s2 in the comparative virtual sample in which the hydrogen content is h and the mean atomic number of the unmeasured elements other than hydrogen is Z, and $I_{s2}$ is a theoretical intensity of the Thomson scattered X-rays of Rh-Kα serving as the second scattered X-rays s2 in the reference virtual sample. In calculating the theoretical intensities of the scattered X-rays, when the mean atomic number Z is an integer, a composition of the comparative virtual sample having a mean atomic number of Z is constituted by an element having that atomic number. When the mean atomic number Z is not an integer, the composition is a compound of two elements of atomic numbers prior to and subsequent to Z that have the same number of atoms.

$$RE = [\{((I_{s1hZ} - I_{s1})/I_{s1})^2 + ((I_{s2hZ} - I_{s2})/I_{s2})^2\}/2]^{1/2} \times 100 \qquad (1)$$

Figure 3:
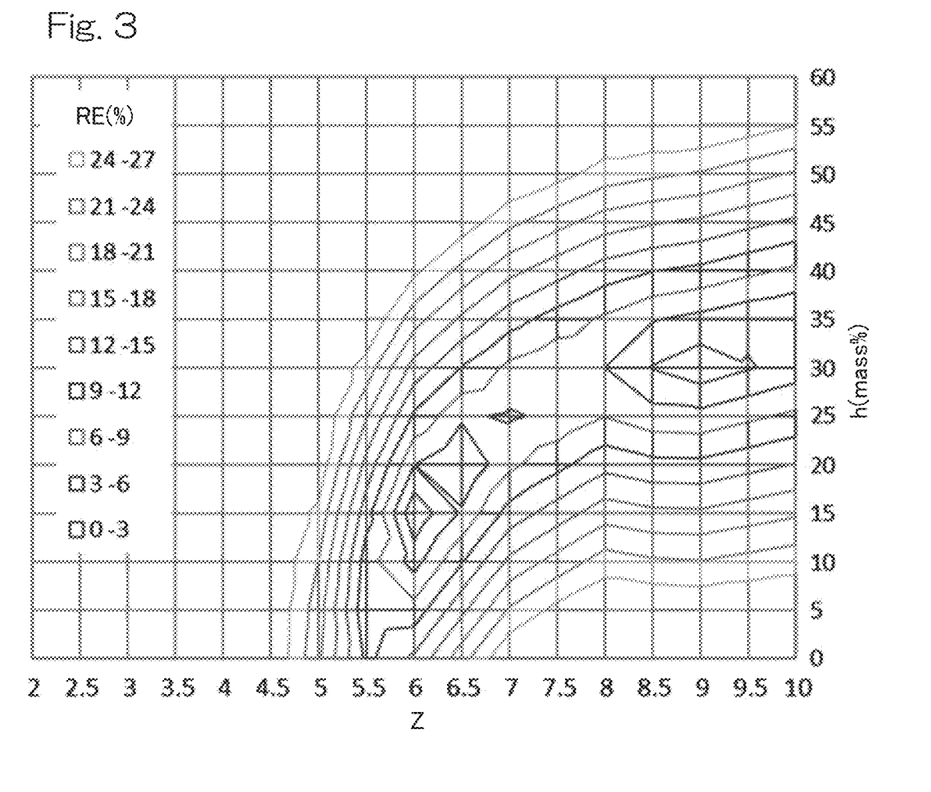
FIG. 3 is a graph showing, using contour lines, relative error rates of comparative virtual samples with respect to a reference virtual sample, according to a conventional technique.

The obtained relative error rates RE are shown using contour lines in FIG. 3. The more inward a contour line is located, the smaller the relative error rate RE thereof, and the region in which the relative error rate RE is minimum should appear in only one location in the vicinity of where the hydrogen content h is 14.3 mass %, and the mean atomic number Z of the unmeasured elements other than the hydrogen is 6. However, according to the results, there are four regions in which the relative error rate RE is 3 to 6%, and two regions in which the relative error rate RE is 0 to 3%. This means that, when the reference virtual sample is used as an actual sample, and the composition is analyzed using the FP method, using the Compton scattered X-rays and Thomson scattered X-rays of Rh-Kα for taking the influence of the unmeasured elements into consideration, the region where the convergence value is reached by iterative calculation varies depending on the setting for initial values or convergence conditions, so that a plurality of such regions are present. Under such a circumstance, when the convergence value is reached in a region other than a region including a point where the hydrogen content h is 14.3 mass % and the mean atomic number Z of the unmeasured elements other than hydrogen is 6, errors in the hydrogen content and the mean atomic number of the unmeasured elements other than hydrogen are increased, resulting in an increase in an error in the content of each measured element.

In the conventional techniques, as the scattered X-rays used for taking the influence of the unmeasured elements into consideration, scattered X-rays of characteristic X-rays of primary X-rays that have a short wavelength (high energy), for example, Compton scattered X-rays and Thomson scattered X-rays of Rh-Kα or Pd-Kα, have been used so as to place importance on the intensity and not to be affected by a diffraction phenomenon due to the atomic structure of the sample. However, these scattered X-rays have similar characteristics, and therefore, as can be understood from FIG. 3, changes in the hydrogen content and changes in the mean atomic number of the unmeasured elements other than hydrogen are not correctly reflected on the intensities of the scattered X-rays.

Therefore, according to the present invention, in order to take the influence of the unmeasured elements into consideration, shorter-wavelength scattered X-rays 4 of the primary X-rays 2 having a wavelength of 0.05 nm or more and 0.075 nm or less, and longer-wavelength scattered X-rays 4 of the primary X-rays 2 having a wavelength of 0.11 nm or more and 0.23 nm or less are used as the scattered X-rays 4 whose intensities are measured by the detection unit 9. For example, FIG. 4 shows contour lines of the relative error rate RE obtained in the same manner as FIG. 3, using the Compton scattered X-rays of Rh-Kα for the shorter wavelength side, and scattered X-rays, having a wavelength of Cu-Kα, of the continuous X-rays for the longer wavelength side.

To be exact, the scattered X-rays, having the wavelength of Cu-Kα, of the continuous X-rays are composed of Thomson scattered X-rays resulting from continuous X-rays having the wavelength of Cu-Kα being incident on and scattered by the sample, and Compton scattered X-rays resulting from continuous X-rays having a wavelength slightly shorter than Cu-Kα being incident on and scattered by the sample. However, to facilitate calculation, a theoretical intensity of the scattered X-rays, having the wavelength of Cu-Kα, of the continuous X-rays is set to be a total of a theoretical intensity of the Thomson scattered X-rays resulting from the continuous X-rays having the wavelength of Cu-Kα being incident on and scattered by the sample, and a theoretical intensity of Compton scattered X-rays (having a wavelength slightly longer than Cu-Kα) resulting from the continuous X-rays having the wavelength of Cu-Kα being incident on and scattered by the sample.

Figure 4:
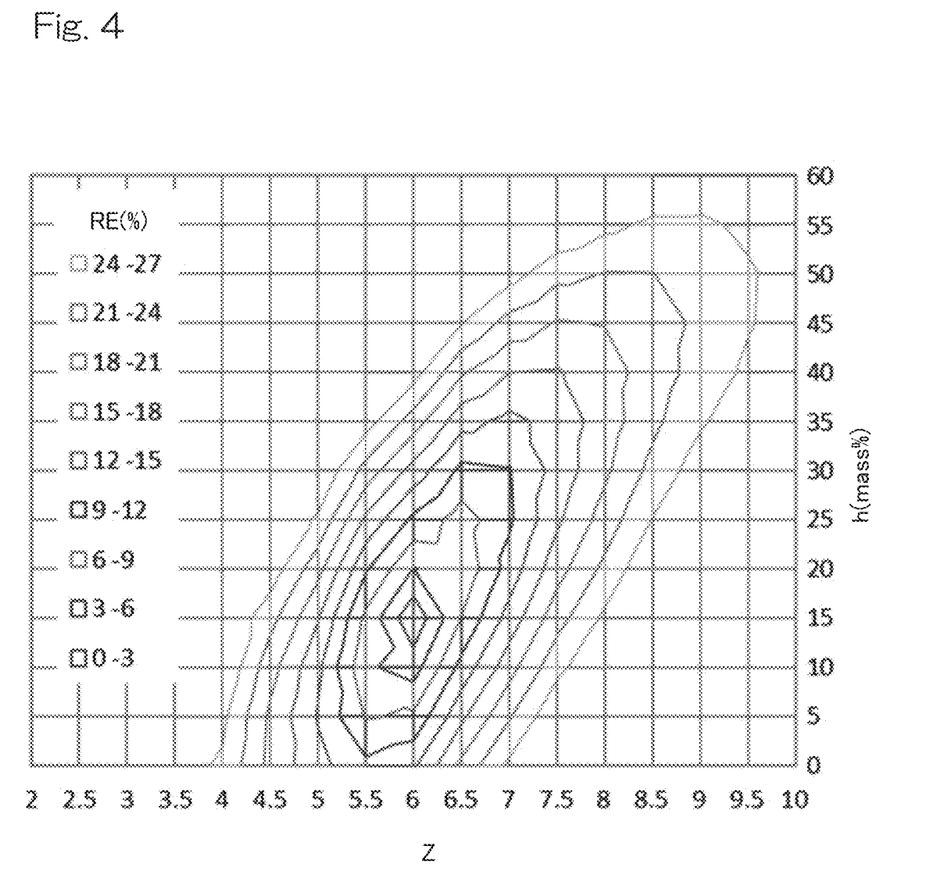
FIG. 4 is a graph showing, using contour lines, the relative error rates of the comparative virtual samples with respect to the reference virtual sample, according to the present invention.

In FIG. 4, the relative error rate RE becomes minimum in only one region that includes a point at which the hydrogen content h is 14.3 mass % and the mean atomic number Z of the unmeasured elements other than hydrogen is 6. From this, it can be understood that changes in the hydrogen content and changes in the mean atomic number of the unmeasured elements other than hydrogen are correctly reflected on the intensity of the scattered X-rays, having a wavelength of Cu-Kα, of the continuous X-rays, which is on the longer wavelength side, and the intensity of the Compton scattered X-rays of Rh-Kα, which is on the shorter wavelength side.

Furthermore, combinations of a plurality of types of scattered X-rays used for taking the influence of the unmeasured elements into consideration will be discussed in detail. As shown in the table in FIG. 5, scattered X-rays serving as candidates for combinations are considered in the range of 0.062 to 0.275 nm for the longer wavelength side, and the range of 0.056 to 0.229 nm for the shorter wavelength side.

For each of the combinations, contour lines of the relative error rate RE are obtained in the same manner as in the cases of FIGS. 3 and 4. The approximate value of the error in the hydrogen content and the approximate value of the error in the mean atomic number of the unmeasured elements other than hydrogen, when the relative error rate RE is 1%, are determined and denoted as "h error" and "Z error", respectively.

Figure 5:
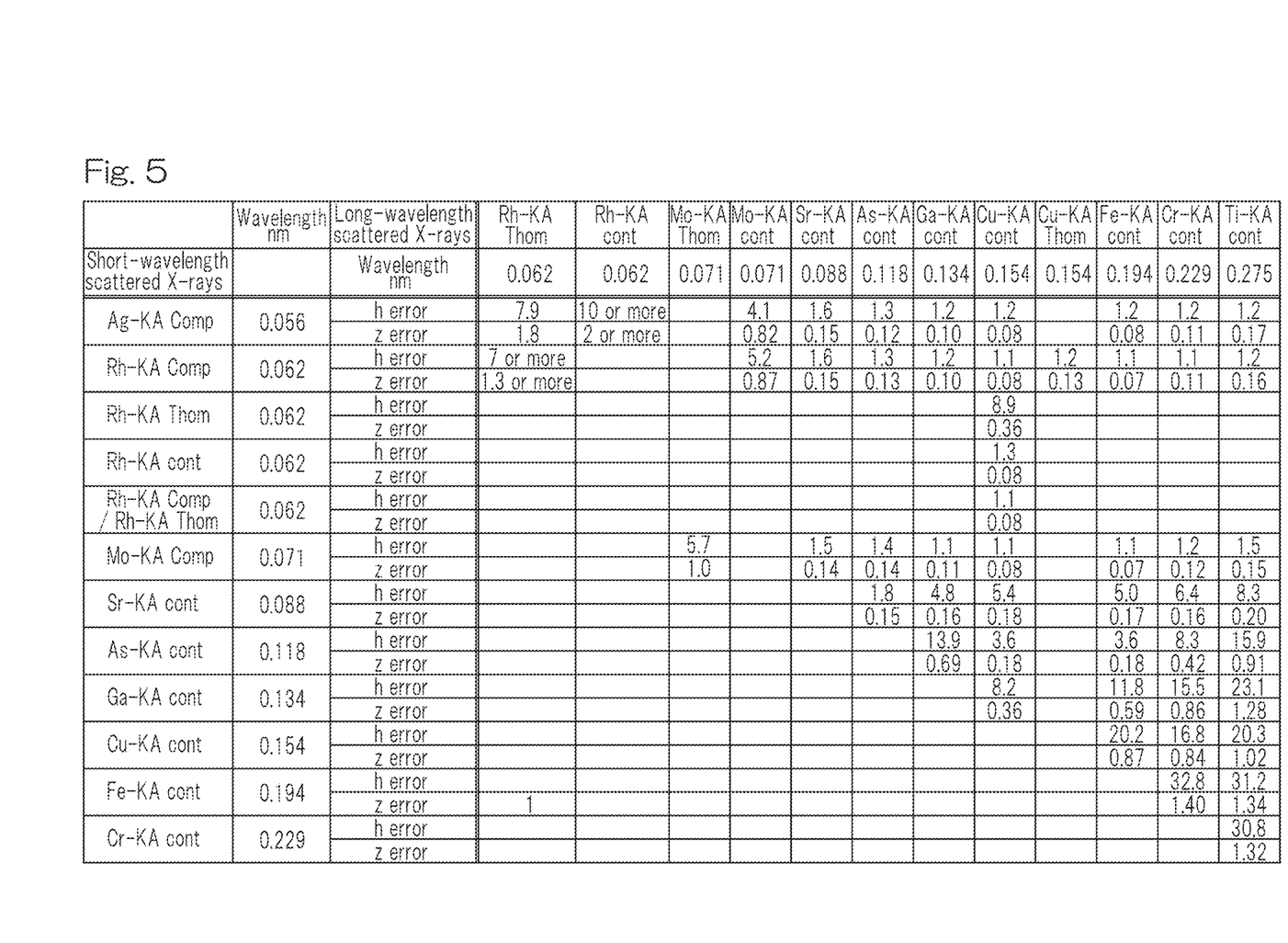
FIG. 5 is a table showing, when the relative error rate is 1%, errors in a content of hydrogen and errors in a mean atomic number of unmeasured elements other than hydrogen for combinations of scattered X-rays used for taking an influence of the unmeasured elements into consideration.

In FIG. 5, for example, "Ag-KA Comp" means Compton scattered X-rays of Ag-Kα which are the characteristic X-rays of the primary X-rays, "Rh-KA Thom" means Thomson scattered X-rays of Rh-Kα which are the characteristic X-rays of the primary X-rays, and "Rh-KA cont" means scattered X-rays, having the same wavelength as Rh-Kα, of the continuous X-rays of the primary X-rays. In addition, "Rh-KA Comp/Rh-KA Thom" on the shorter wavelength side means that Compton scattered X-rays of Rh-Kα which are the characteristic X-rays of the primary X-rays, and the Thomson scattered X-rays of same Rh-Kα, are used as the shorter-wavelength scattered X-rays, and a theoretical intensity ratio and a measured intensity ratio between the Compton scattered X-rays of Rh-Kα and the Thomson scattered X-rays of Rh-Kα are used as the theoretical intensity and the measured intensity of the scattered X-rays in the calculation using the FP method.

From the numerical values of the error (h error) in the hydrogen content and the error (Z error) in the mean atomic number in FIG. 5, as the plurality of types of scattered X-rays used for taking the influence of the unmeasured elements into consideration, it is appropriate to combine the longer-wavelength scattered X-rays 4 of the primary X-rays 2 having the wavelength of 0.11 nm or more and 0.23 nm or less, and the shorter-wavelength scattered X-rays 4 of the primary X-rays 2 having the wavelength of 0.05 nm or more and 0.075 nm or less, as previously described.

It appears that longer-wavelength scattered X-rays, having a wavelength of Ti-Kα, of the continuous X-rays may be used. However, the numerical values in FIG. 5 are obtained through simulation, and the intensity of the scattered X-rays decreases with an increase in the wavelength in actual measurement, resulting in a reduction in the relative measurement precision for the X-ray intensity. Therefore, scattered X-rays, having a further longer wavelength, of the continuous X-rays is not appropriate for use in the present invention. Moreover, Compton scattered X-rays and Thomson scattered X-rays, having a further longer wavelength, of the characteristic X-rays of the primary X-rays are excluded from the candidates for the scattered X-rays in FIG. 5 because the intensity of the Compton scattered X-rays is extremely small, and the Thomson scattered X-rays are affected by the diffraction phenomenon due to the atomic structure of the sample, so that the correlation between the theoretical intensity and the measured intensity is destroyed.

As can be understood from significant errors in the combination of the longer-wavelength scattered X-rays, having a wavelength of Cu-Kα, of the continuous X-rays and the shorter-wavelength Thomson scattered X-rays of Rh-Kα, it is inappropriate to use only Thomson scattered X-rays on the shorter wavelength side. As denoted as "Rh-KA Comp/Rh-KA Thom", Thomson scattered X-rays should be used together with Compton scattered X-rays of the same characteristic X-rays, and the theoretical intensity ratio and the measured intensity ratio between the Compton scattered X-rays and the Thomson scattered X-rays should be used as the theoretical intensity and the measured intensity of the scattered X-rays in the calculation using the FP method.

Although not illustrated in FIG. 5, on the longer wavelength side, the Compton scattered X-rays of the characteristic X-rays of the primary X-rays may be used together with the Thomson scattered X-rays of the same characteristic X-rays, and a total theoretical intensity and a total measured intensity of the Compton scattered X-rays and the Thomson scattered X-rays may be used as the theoretical intensity and the measured intensity of the scattered X-rays in the calculation using the FP method. This is due to the fact that the longer-wavelength Compton scattered X-rays have a lower intensity than the Thomson scattered X-rays, and moreover, the energies (wavelengths) of the two types of scattered X-rays are in close proximity, and thus are difficult to be measured separately.

In the calculation unit 10 included in the X-ray fluorescence spectrometer according to the first embodiment, the scattered X-rays used for taking the influence of the unmeasured elements into consideration are set by using the method as described above. The operations performed therefor will be described according to the flowchart shown in FIG. 2. Note that the instrument sensitivity constant used for converting the measured intensity into a theoretical intensity scale to obtain a converted measured intensity is determined in advance by a known technique using a standard sample, and is input to the calculation unit 10. In the spectrometer according to the first embodiment, the area density of the sample is not analyzed. However, the area density is also input to the calculation unit 10 when the sample does not have an infinite thickness for X-rays, and thus the theoretical intensity calculation requires the area density.

Figure 2:
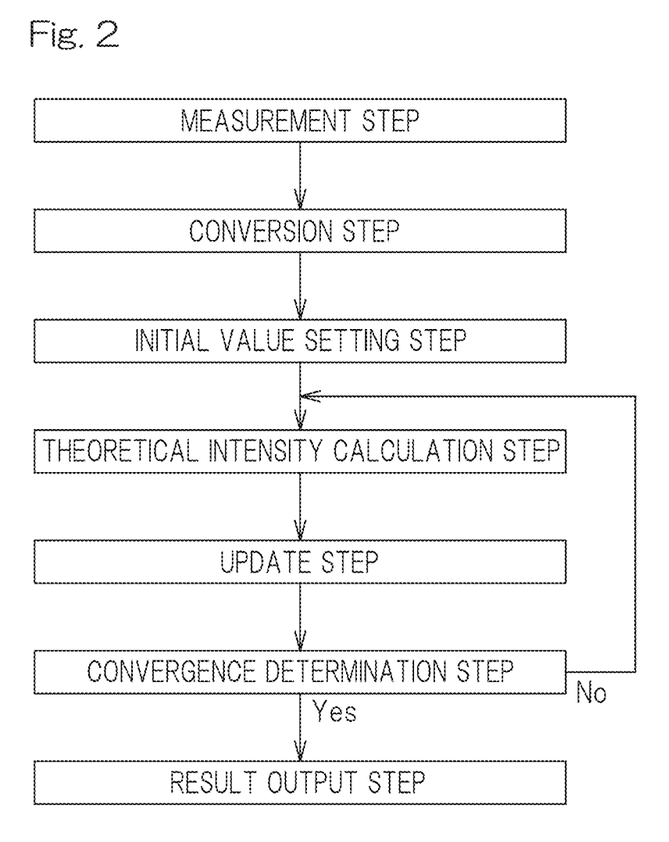
FIG. 2 is a flowchart illustrating operations of a calculation unit included in the spectrometer.

A case where the Fe content is calculated for a polyethylene (—CH$_2$—) sample having an area density of 300 mg/cm$^2$ is taken as an example. First, in a measurement step, intensity $I_{fmeasM}$ of fluorescent X-rays Fe-K$\alpha$, which are fluorescent X-rays generated from the element Fe in the sample 13, intensity $I_{smeasM}$ of Compton scattered X-rays of Rh-K$\alpha$, which are shorter-wavelength scattered X-rays, and intensity $I_{smeasM}$ of scattered X-rays, having a wavelength of Cu-K$\alpha$, of the continuous X-rays, which are longer-wavelength scattered X-rays, are measured.

Next, in a conversion step, measured intensities $I_{measM}$ ($I_{fmeasM}$ and $I_{smeasM}$) of the fluorescent X-rays and the scattered X-rays are converted into a theoretical intensity scale using the following expression (2), to obtain the respective converted measured intensities $I_{measT}$ ($I_{fmeasT}$ and $I_{smeasT}$). Here, A, B, and C are the above-described instrument sensitivity constants, and are determined for each type of the fluorescent X-rays and each type of the scattered X-rays. The expression (2) may be a linear expression.

$$I_{measT} = A(I_{measM})^2 + BI_{measM} + C \tag{2}$$

Next, in an initial value setting step, initial values for the respective contents of the measured element Fe and hydrogen, and an initial value for the mean atomic number of the unmeasured element C other than hydrogen, are set. The initial values for the contents can be set using various known methods. Although the initial value for Fe is set to 0.02 mass % and the initial value for hydrogen is set to 0.0 mass % here, all the initial values may be set to 1 mass %. The initial value for the mean atomic number of the unmeasured element other than hydrogen is set to 7, for example.

Next, the procedure enters into iterative calculation, during which, in a theoretical intensity calculation step, theoretical intensity $I_{FTi}$ of the fluorescent X-rays Fe-K$\alpha$, theoretical intensity $I_{STk}$ of the Compton scattered X-rays of Rh-K$\alpha$, and theoretical intensity $I_{STk}$ of the scattered X-rays, having the wavelength of Cu-K$\alpha$, of the continuous X-rays are calculated on the basis of the latest contents and the latest mean atomic number, using known theoretical intensity formulas. Note that the subscript i indicates the theoretical intensity of the i-th measured element (fluorescent X-rays), and the subscript k indicates the theoretical intensity of the k-th scattered X-rays. However, in the example currently taken, there is only one measured element (fluorescent X-rays), and there are two types of scattered X-rays.

Next, in an update step, the respective contents of the elements Fe and H, and the mean atomic number of the unmeasured element C other than hydrogen are updated on the basis of difference equations. Specifically, first, simultaneous difference equations for the following expressions (3) and (4) are formulated for each type of the fluorescent X-rays and each type of the scattered X-rays, and the simultaneous difference equations are solved to obtain correction values $\Delta wj$ and $\Delta Z$ for respectively updating contents wj of the elements j (Fe, H) and the mean atomic number Z of the unmeasured element C other than hydrogen.

For this purpose, each of the contents of the elements and the mean atomic number of the unmeasured element other than hydrogen is changed by a predetermined value, and a changed theoretical intensity is calculated. That is, theoretical intensity $I_{FTi}{}^{j}$ of the i measured element (i fluorescent X-rays) when the contents of the j elements are changed by dw (mass %), and theoretical intensity $I_{FTi}{}^{Z}$ of the i measured element (i fluorescent X-rays) when the mean atomic number of the unmeasured element other than hydrogen is changed by dZ are calculated for the fluorescent X-rays, and theoretical intensity $I_{STk}{}^{j}$ of the k scattered X-rays when the contents of the j elements are changed by dw (mass %), and theoretical intensity $I_{STk}{}^{Z}$ of the k scattered X-rays when the mean atomic number of the unmeasured element other than hydrogen is changed by dZ are calculated for the scattered X-rays. dZ is 0.05, for example.

$$I_{fmeasTi} - I_{FTi} = (dI_{FTi}/dZ)\Delta Z + \Sigma(dI_{FTi}/dwj)\Delta wj \tag{3}$$

$$I_{smeasTk} - I_{STk} = (dI_{STk}/dZ)\Delta Z + \Sigma(dI_{STk}/dwj)\Delta wj \tag{4}$$

Here, for the fluorescent X-rays, differential terms are determined using the following expressions (5-1) and (5-2).

$$(dI_{FTi}/dZ) = ((I_{FTi} - I_{FTi}{}^{Z})/dZ) \tag{5-1}$$

$$(dI_{FTi}/dwj) = ((I_{FTi} - I_{FTi}{}^{j})/dwj) \tag{5-2}$$

For the scattered X-rays, when the intensity of the Compton scattered X-rays, the Thomson scattered X-rays or the like is used alone as the intensity of the scattered X-rays, differential terms are determined using the following expressions (6-1) and (6-2) as in the case of the fluorescent X-rays.

$$(dI_{STk}/dZ) = ((I_{STk} - I_{STk}{}^{Z})/dZ) \tag{6-1}$$

$$(dI_{STk}/dwj) = ((I_{STk} - I_{STk}{}^{j})/dwj) \tag{6-2}$$

For example, when the intensity ratio between the Compton scattered X-rays and the Thomson scattered X-rays is used as the intensity of the scattered X-rays, the intensity ratio between the two types of scattered X-rays is applied instead of using the intensity of only one type of scattered X-rays. For example, as in the following expression (7), the ratio of theoretical intensity $I_{STkComp}$ of the Compton scattered X-rays to theoretical intensity $I_{STkThom}$ of the Thomson scattered X-rays is applied to the theoretical intensity Is-k of the scattered X-rays in the above expressions (4), (6-1), and (6-2) as theoretical intensity ratio $I_{STkR}$ of the scattered X-rays.

$$I_{STkR} = (I_{STkComp}/I_{STKCompThom}) \tag{7}$$

Similarly, the intensity ratio of the scattered X-rays is also applied to the converted measured intensity $I_{smeasMk}$ of the scattered X-rays in the above expression (4) and the measured intensity $I_{measM}$ of the scattered X-rays in the above expression (2), as well as in a convergence determination step described later. Furthermore, in the case of using, as the intensity of the scattered X-rays, a total intensity of the Compton scattered X-rays and the Thomson scattered X-rays, for example, a total intensity of the two types of scattered X-rays is applied instead of using the intensity of only one type of scattered X-rays.

The simultaneous difference equations in the expressions (3) and (4) formulated in this manner are solved, and the correction values $\Delta wj$ and $\Delta Z$ are determined for the contents wj of the elements j (Fe, H) and the mean atomic number Z of the unmeasured element C other than hydrogen, and the correction values are added to the original values $wj_{old}$ and $Z_{old}$ as in the following expressions (8) and (9), thereby determining updated values $wj_{new}$ and $Z_{new}$. The content of the unmeasured element C other than hydrogen is obtained by subtracting a total of the contents wj of the measured element Fe and hydrogen from 100 mass %.

$$wj_{new} = wj_{old} + \Delta wj \quad (8)$$

$$Z_{new} = Z_{old} + \Delta Z \quad (9)$$

Note that three or more kinds of the intensity of scattered X-rays, the intensity ratio of scattered X-rays, and the total intensity of scattered X-rays may be used. In this case, there are three or more expressions (4), and the correction values $\Delta wj$ and $\Delta Z$ are determined using a least squares method.

Next, in a convergence determination step, the theoretical intensity $I_{FTi}$ of the fluorescent X-rays and the theoretical intensity $I_{STk}$ of the scattered X-rays are calculated on the basis of the updated contents $wj_{new}$, of the elements j (Fe, H) and the updated mean atomic number $Z_{new}$ of the unmeasured element C other than hydrogen, and convergence determination is performed on the basis of whether or not the difference from each of the converted measured intensities $I_{measT}$ determined using the above expression (2) is less than or equal to a predetermined value. The convergence determination may be performed on the basis of whether or not the difference between the theoretical intensity and the converted measured intensity is less than or equal to a predetermined ratio (e.g., 0.1%) of the converted measured intensity. If it is determined that convergence has not been reached, the procedure returns to the theoretical intensity calculation step, and the steps up to the convergence determination step are repeated. That is, for the secondary X-rays (the fluorescent X-rays of the measured element and the scattered X-rays used for taking the influence of the unmeasured element into consideration) generated from the sample, the assumed contents of the elements Fe and H and the assumed mean atomic number of the unmeasured element C other than hydrogen are recalculated through successive approximation such that the theoretical intensity and the converted measured intensity match.

Then, if it is determined that convergence has been reached, the procedure proceeds to a result output step, in which the latest contents of the elements Fe and H, and the latest mean atomic number of the unmeasured element C other than hydrogen are output as results.

Note that the update step can be performed separately in the following update step A and update step B. First, in the update step A, the mean atomic number of the unmeasured element C other than hydrogen is fixed, and only the contents of the elements Fe and H are updated. Next, in the update step B, the contents of the elements Fe and H are fixed at the latest values, and $\Delta Z$ is determined from the following expression (10), and only the mean atomic number of the unmeasured element C other than hydrogen is updated.

$$I_{seamsTk} - I_{STk} = (dI_{STk}/dZ)\Delta Z \quad (10)$$

Although results of analyzing actual samples will be described later, with the X-ray fluorescence spectrometer according to the first embodiment, the respective wavelengths of a plurality of types of scattered X-rays used for taking the influence of the unmeasured elements into consideration are appropriately set such that the scattered X-rays differ in characteristics and have sufficient intensities. Accordingly, a sample containing a large amount of hydrogen in particular as the unmeasured element can be sufficiently accurately analyzed.

Next, an X-ray fluorescence spectrometer according to a second embodiment of the present invention will be described. In the spectrometer according to the second embodiment, the calculation unit 10 further recalculates, also on the basis of an assumed area density, the assumed contents of the elements and the assumed area density through successive approximation, to calculate the content of each element and an area density in the sample. In this case, the calculation unit 10, in order to calculate the area density, uses, as the scattered X-rays whose intensities are measured by the detection unit 9, the shorter-wavelength scattered X-rays of the primary X-rays that are different from the shorter-wavelength scattered X-rays of the primary X-rays used for taking the influence of the unmeasured elements into consideration. Taking, as an example, a case where the Fe content and the area density are calculated for a polyethylene (—$CH_2$—) sample, the shorter-wavelength scattered X-rays of the primary X-rays used for taking the influence of the unmeasured elements into consideration are the Compton scattered X-rays of Rh-K$\alpha$, and the Thomson scattered X-rays of Rh-K$\alpha$ are used to calculate the area density.

Also, the calculation unit 10 solves simultaneous difference equations formulated for each type of the fluorescent X-rays and each type of the scattered X-rays whose intensities have been measured by the detection unit 9, determines a correction value for updating the assumed content of each element, a correction value for updating the assumed mean atomic number, and a correction value for updating the assumed area density, thereby recalculating the assumed contents of the elements, the assumed mean atomic number, and the assumed area density through successive approximation such that the theoretical intensity and the converted measured intensity match for each type of the fluorescent X-rays and each type of the scattered X-rays, to calculate the content of each element and the area density in the sample. The calculation unit 10, in performing this calculation, additionally uses, as the theoretical intensity and the measured intensity of the scattered X-rays, the theoretical intensity and the measured intensity of the Thomson scattered X-rays of Rh-K$\alpha$ which are the characteristic X-rays of the primary X-rays, for the shorter-wavelength scattered X-rays of the primary X-rays.

That is, compared to the calculation unit 10 of the spectrometer according to the first embodiment, in order to analyze the area density D (mg/cm$^2$) simultaneously, The Thomson scattered X-rays of Rh-K$\alpha$ are added as the scattered X-rays to be measured, the above expression (4) is added for the Thomson scattered X-rays of Rh-K$\alpha$, and differential terms $(dI_{FHi}/dD)\Delta D$ and $(dI_{STk}/dD)\Delta D$ of the area density D are added to the right-hand side of the simultaneous difference equations (3) and (4). Since the area density D is also analyzed, the initial value for the area density D is set in the initial value setting step together with the initial values for the contents and the initial value for the mean atomic number Z of the unmeasured elements other than hydrogen, instead of the area density D being input as the fixed value before the measurement step.

Using the spectrometer according to the second embodiment, the composition and the area density D of a disk-shaped sample made of an ABS resin containing nitrogen were analyzed. A polyethylene standard sample was used as a standard sample for determining the instrument sensitivity constant. From the results obtained from qualitative analysis, the measured elements were Cd, Cr, Hg, and Pb. Then, using, as discussed in the description of the spectrometer in the first embodiment, the scattered X-rays, having a wavelength of Cu-Kα, of the continuous X-rays, which are longer-wavelength scattered X-rays, and the Compton scattered X-rays of Rh-Kα, which are shorter-wavelength scattered X-rays, to take the influence of the unmeasured elements into consideration, the Thomson scattered X-rays of Rh-Kα, which are shorter-wavelength scattered X-rays, are additionally used to calculate the area density as described above.

The results of this quantitative analysis are shown in Table 1. In Table 1, "Standard value" indicates known standard values in an analytical sample, and "Quantitative value 1" indicates quantitative values obtained using the spectrometer according to the second embodiment. In addition, the quantitative values of the contents and the mean atomic number Z of the unmeasured elements other than hydrogen when the area density D is input as the fixed value 215 serving as a standard value, or in other words, quantitative values obtained using the spectrometer according to the first embodiment, are described as "Quantitative value 2". Both quantitative values closely match the standard values.

TABLE 1

|  | D mg/cm$^2$ | Cd mass % | Cr mass % | Hg mass % | Pb mass % | H mass % | Z |
|---|---|---|---|---|---|---|---|
| Standard value | 215 | 0.0094 | 0.0944 | 0.0939 | 0.0941 | — | — |
| Quantitative value 1 | 211 | 0.0090 | 0.0976 | 0.0960 | 0.0941 | 6.74 | 6.06 |
| Quantitative value 2 | (215) | 0.0089 | 0.0970 | 0.0948 | 0.0945 | 5.21 | 6.03 |

With the X-ray fluorescence spectrometer according to the first embodiment described above, the respective wavelengths of a plurality of types of scattered X-rays used for taking the influence of the unmeasured elements into consideration are appropriately set such that the scattered X-rays differ in characteristics and have sufficient intensities. Accordingly, as indicated by "Quantitative value 2" in Table 1, a sample containing a large amount of hydrogen in particular as the unmeasured element can be sufficiently accurately analyzed. With the X-ray fluorescence spectrometer according to the second embodiment, the wavelength of the scattered X-rays used for calculating the area density D is also appropriately set. Accordingly, as indicated by the quantitative value 1 in Table 1, the area density D of the sample can also be sufficiently accurately analyzed.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . X-ray source
2 . . . primary X-rays
4 . . . fluorescent X-rays, scattered X-rays (secondary X-rays)
9 . . . detection unit
10 . . . calculation unit
13 . . . sample

What is claimed is:
1. An X-ray fluorescence spectrometer comprising:
an X-ray source configured to irradiate a sample with primary X-rays;
a detection unit configured to measure an intensity of fluorescent X-rays generated from each of elements in the sample, and intensities of scattered X-rays of the primary X-rays; and
a calculation unit configured to: calculate a theoretical intensity of the fluorescent X-rays generated from said each element in the sample on the basis of assumed contents of the elements; and recalculate the assumed contents of the elements through successive approximation such that the theoretical intensity matches a converted measured intensity obtained by converting a measured intensity obtained by the detection unit into a theoretical intensity scale, to calculate a content of each element in the sample, wherein
the calculation unit is configured to:
in order to take into consideration an influence of unmeasured elements for which the fluorescent X-rays are not measured, use shorter-wavelength scattered X-rays of the primary X-rays having a wavelength of 0.05 nm or more and 0.075 nm or less, and longer-wavelength scattered X-rays of the primary X-rays having a wavelength of 0.11 nm or more and 0.23 nm or less, as the scattered X-rays whose intensities are measured by the detection unit, assume a mean atomic number for elements other than hydrogen included in the unmeasured elements, and assume a content for hydrogen;
solve simultaneous difference equations formulated for each type of the fluorescent X-rays and each type of the scattered X-rays whose intensities have been measured by the detection unit, to determine a correction value for updating the assumed content of each element, and a correction value for updating the assumed mean atomic number, thereby recalculating the assumed contents of the elements and the assumed mean atomic number through successive approximation such that the theoretical intensity and the converted measured intensity match for each type of the fluorescent X-rays and each type of the scattered X-rays, to calculate the content of each element in the sample; and
in performing said calculation, as the theoretical intensity and the measured intensity of the scattered X-rays, use a theoretical intensity and a measured intensity of Compton scattered X-rays of characteristic X-rays of the primary X-rays, a theoretical intensity ratio and a measured intensity ratio between the Compton scattered X-rays and Thomson scattered X-rays of the characteristic X-rays of the primary X-rays, or a theoretical intensity and a measured intensity of scattered X-rays of continuous X-rays of the primary X-rays, for the shorter-wavelength scattered X-rays of the primary X-rays, and use a theoretical intensity and a measured intensity of the Thomson scattered X-rays of the characteristic X-rays of the primary X-rays, a total theoretical intensity and a total measured intensity of the Compton scattered X-rays and the Thomson scattered X-rays of the characteristic X-rays of the primary X-rays, or the theoretical intensity and the measured intensity of the scattered X-rays of the continuous X-rays of the primary X-rays, for the longer-wavelength scattered X-rays of the primary X-rays.

2. The X-ray fluorescence spectrometer as claimed in claim 1, wherein the calculation unit is further configured to:

also on the basis of an assumed area density, recalculate the assumed contents of the elements and the assumed area density through successive approximation, to calculate the content of each element and an area density in the sample;

in order to calculate the area density, use, as the scattered X-rays whose intensities are measured by the detection unit, the shorter-wavelength scattered X-rays of the primary X-rays that are different from the shorter-wavelength scattered X-rays of the primary X-rays used for taking the influence of the unmeasured elements into consideration;

solve simultaneous difference equations formulated for each type of the fluorescent X-rays and each type of the scattered X-rays whose intensities have been measured by the detection unit, to determine a correction value for updating the assumed content of each element, a correction value for updating the assumed mean atomic number, and a correction value for updating the assumed area density, thereby recalculating the assumed contents of the elements, the assumed mean atomic number, and the assumed area density through successive approximation such that the theoretical intensity and the converted measured intensity match for each type of the fluorescent X-rays and each type of the scattered X-rays, to calculate the content of each element and the area density in the sample; and in performing said calculation, additionally use, as the theoretical intensity and the measured intensity of the scattered X-rays, the theoretical intensity and the measured intensity of the Thomson scattered X-rays of the characteristic X-rays of the primary X-rays for the shorter-wavelength scattered X-rays of the primary X-rays.

* * * * *